Feb. 17, 1953 C. F. RUBEL 2,628,583
ROTARY TAKE-UP LOCK STITCH MACHINE
Filed June 22, 1949 9 Sheets-Sheet 3

INVENTOR.
CHARLES F. RUBEL
BY
ATTORNEY

Feb. 17, 1953  C. F. RUBEL  2,628,583
ROTARY TAKE-UP LOCK STITCH MACHINE
Filed June 22, 1949  9 Sheets-Sheet 4
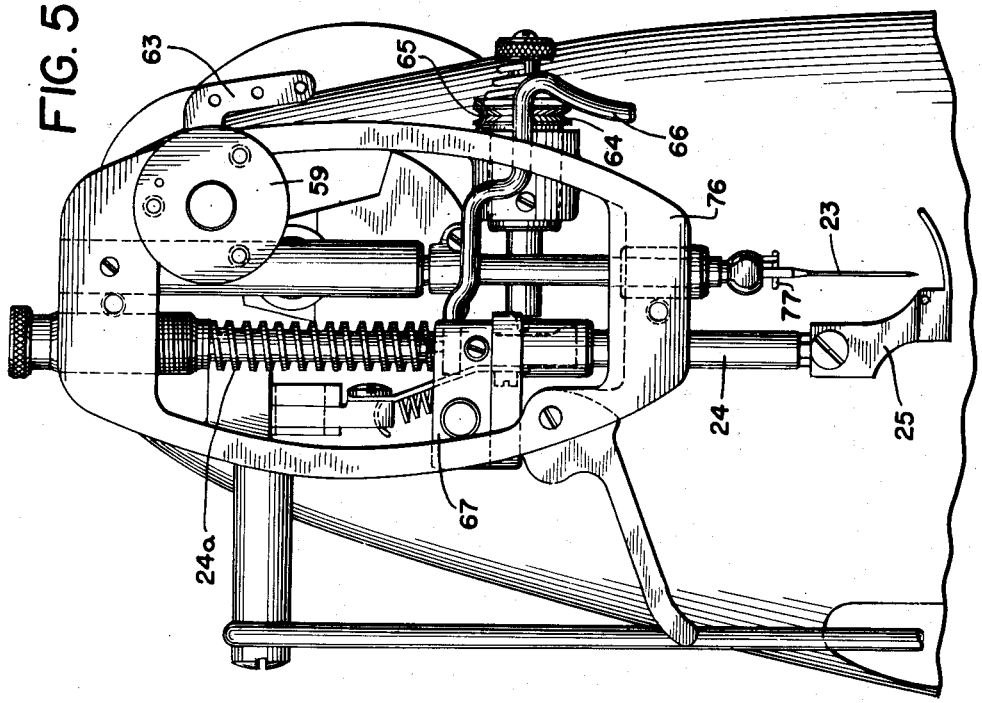
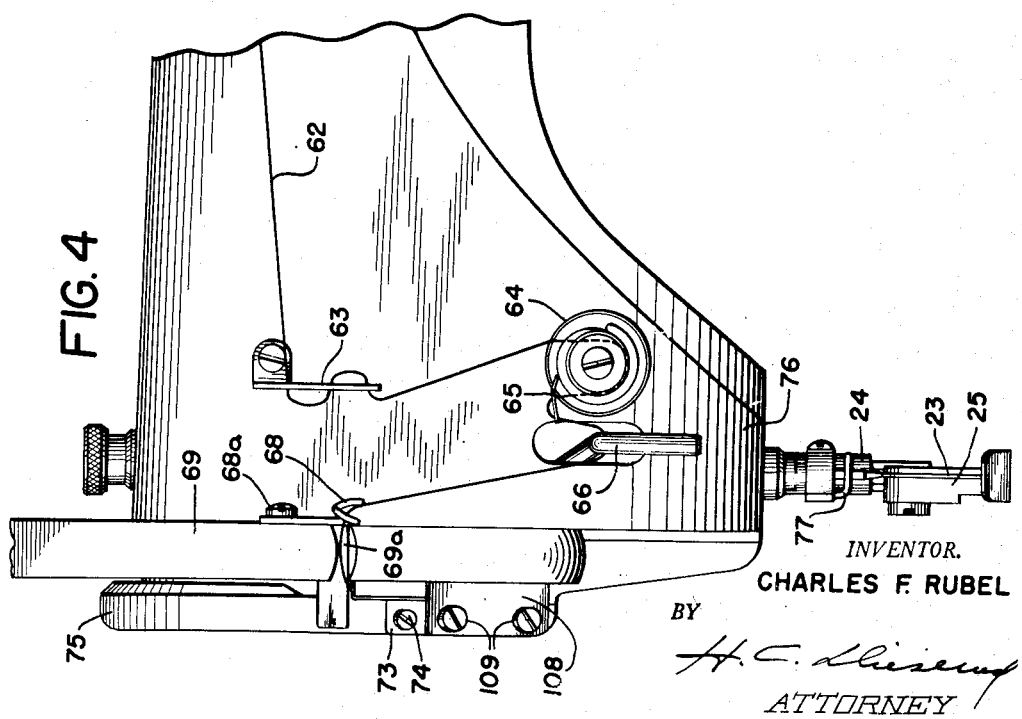
INVENTOR.
CHARLES F. RUBEL
BY
H. C. Liesing
ATTORNEY Feb. 17, 1953 C. F. RUBEL 2,628,583
ROTARY TAKE-UP LOCK STITCH MACHINE
Filed June 22, 1949 9 Sheets-Sheet 5
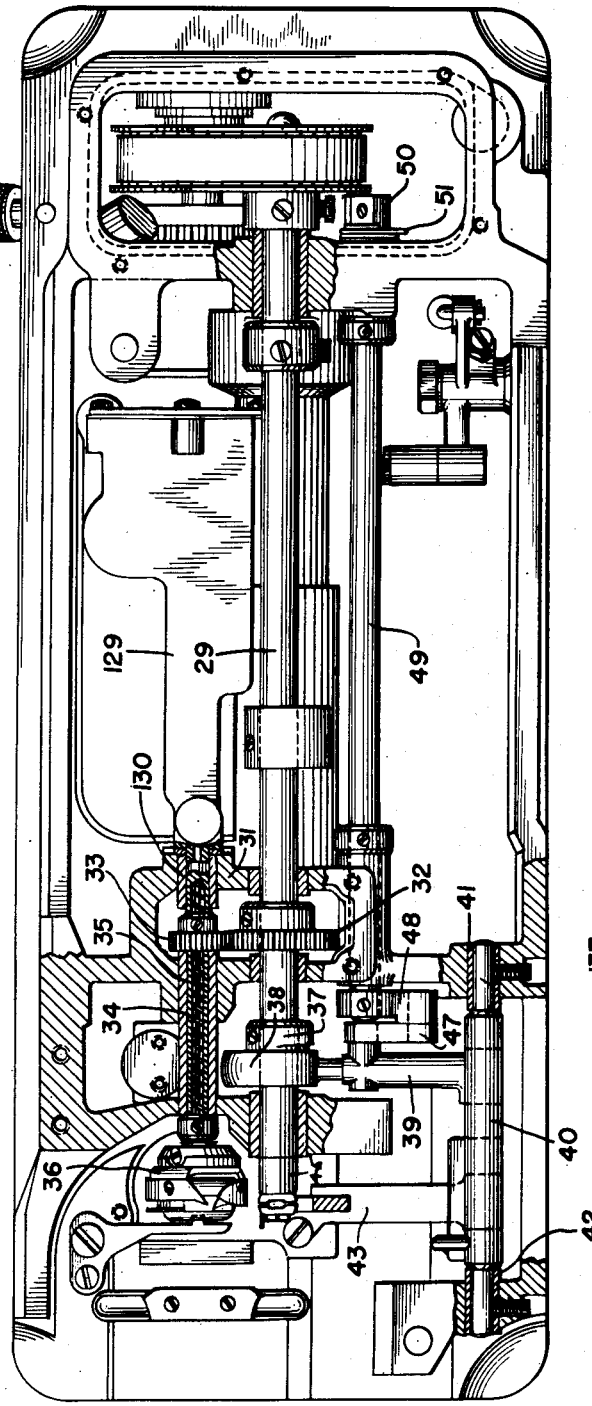
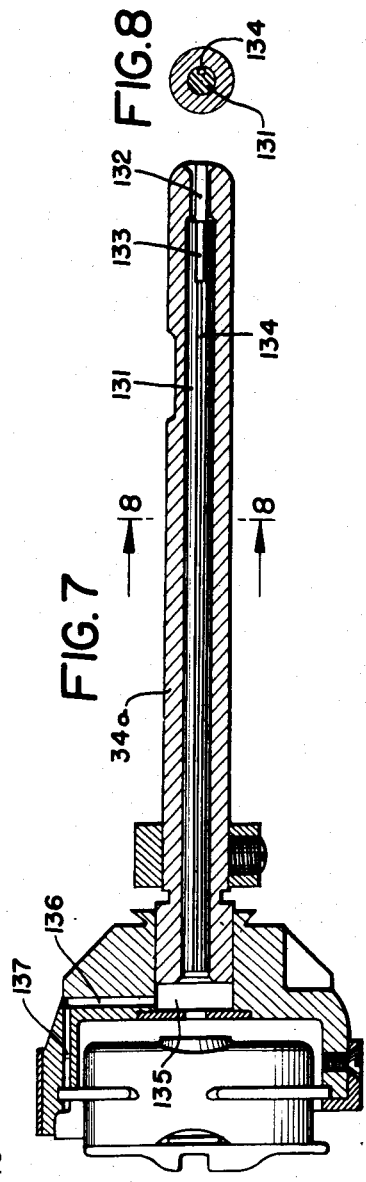
INVENTOR.
CHARLES F. RUBEL
BY
*H. C. [signature]*
ATTORNEY Feb. 17, 1953     C. F. RUBEL     2,628,583
ROTARY TAKE-UP LOCK STITCH MACHINE
Filed June 22, 1949     9 Sheets-Sheet 6
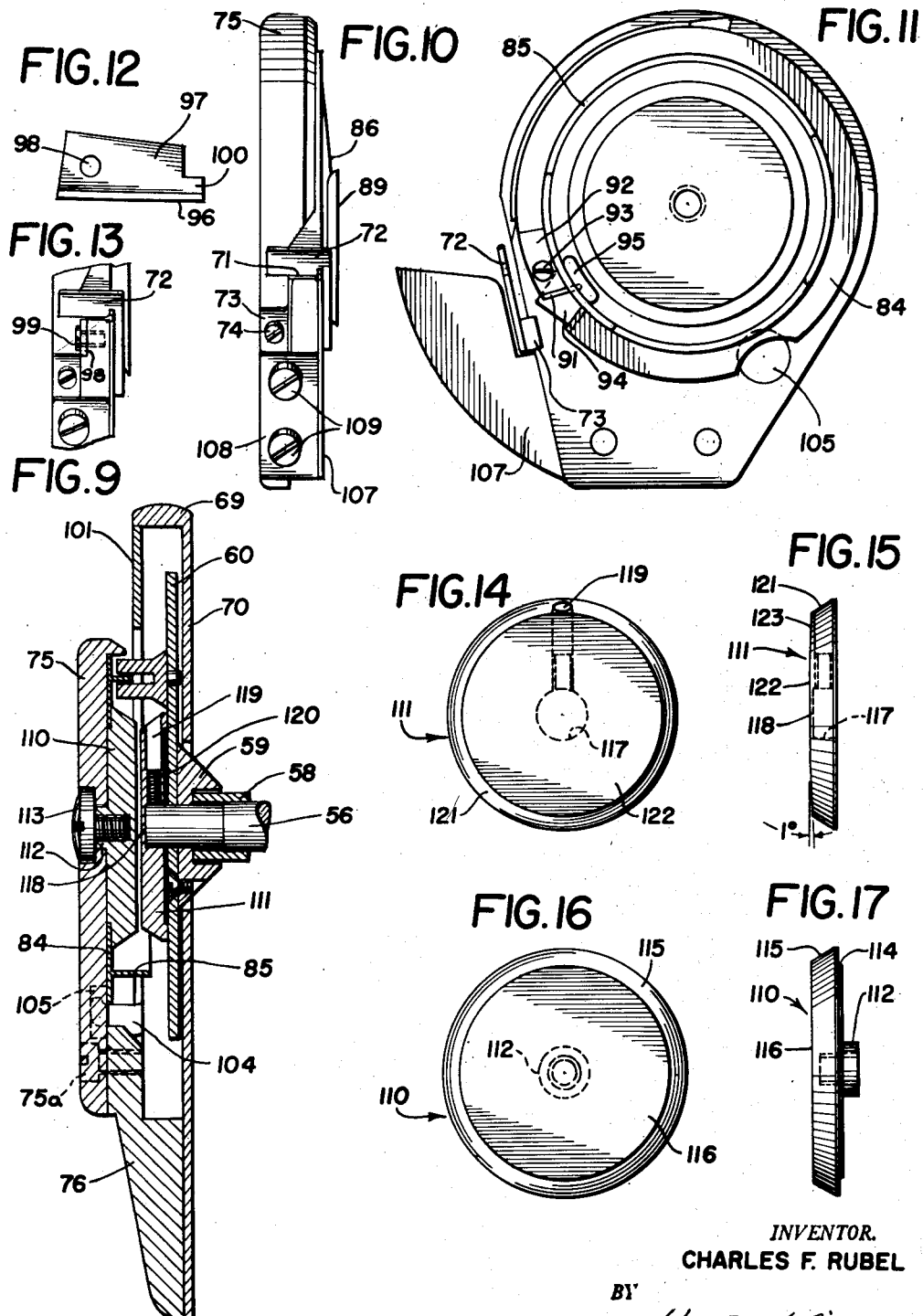
INVENTOR.
CHARLES F. RUBEL
BY
ATTORNEY Feb. 17, 1953          C. F. RUBEL          2,628,583
ROTARY TAKE-UP LOCK STITCH MACHINE
Filed June 22, 1949                                9 Sheets—Sheet 7
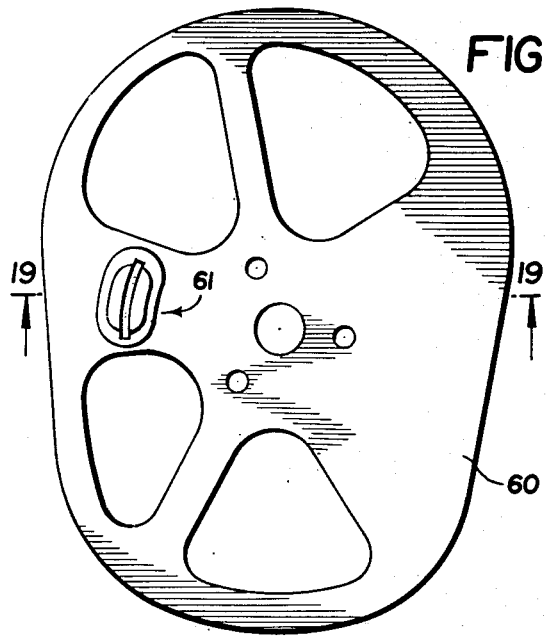
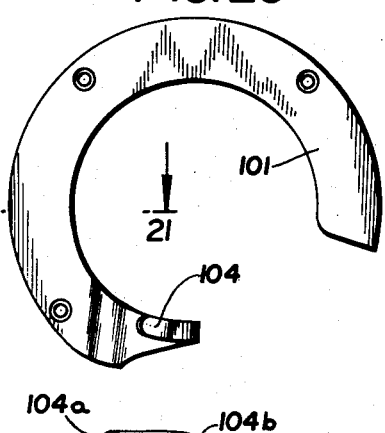
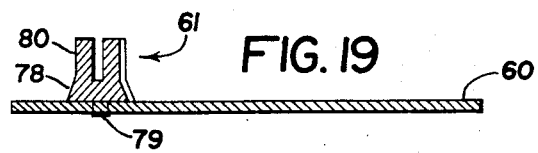
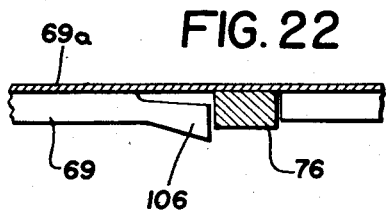
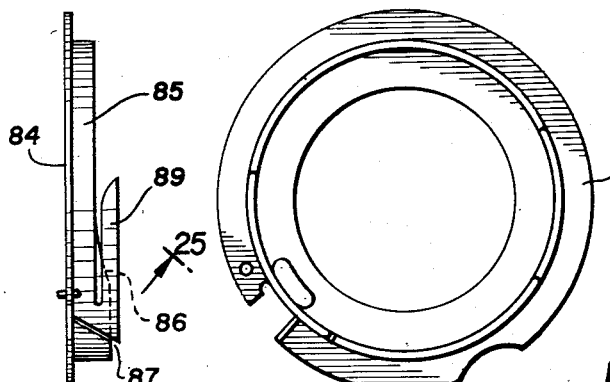
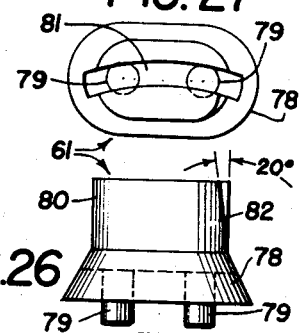
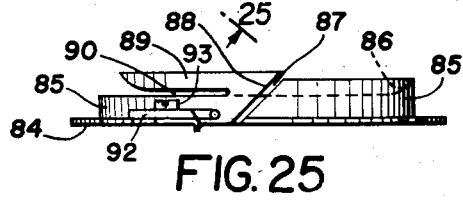
INVENTOR.
CHARLES F. RUBEL
BY
*H. C. [signature]*
ATTORNEY Feb. 17, 1953     C. F. RUBEL     2,628,583
ROTARY TAKE-UP LOCK STITCH MACHINE Filed June 22, 1949     9 Sheets—Sheet 8

INVENTOR.
CHARLES F. RUBEL
BY
ATTORNEY

Feb. 17, 1953 C. F. RUBEL 2,628,583
ROTARY TAKE-UP LOCK STITCH MACHINE
Filed June 22, 1949 9 Sheets-Sheet 9
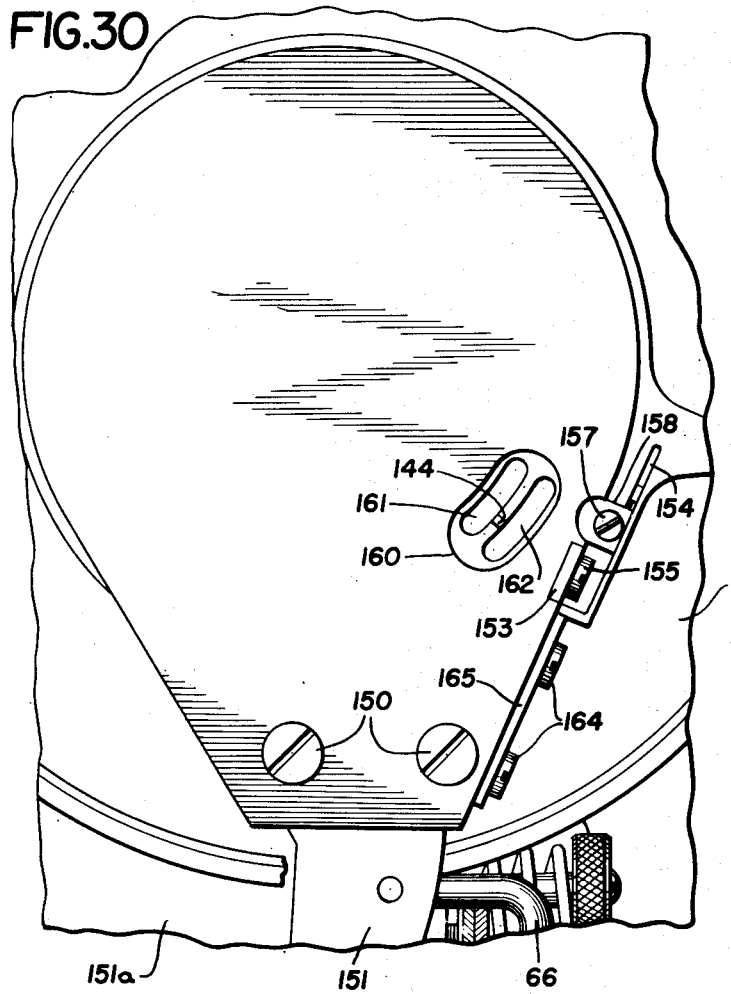
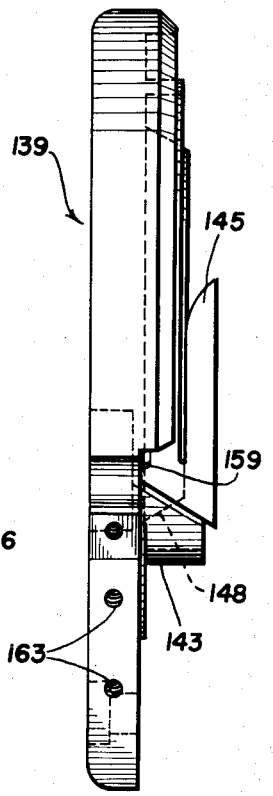
INVENTOR.
CHARLES F. RUBEL
BY
ATTORNEY Patented Feb. 17, 1953

2,628,583

UNITED STATES PATENT OFFICE 2,628,583

ROTARY TAKE-UP LOCK STITCH MACHINE

Charles F. Rubel, Chicago, Ill., assignor to Union Special Machine Company, Chicago, Ill., a corporation of Illinois Application June 22, 1949, Serial No. 100,619

20 Claims. (Cl. 112—248)

This invention relates to lockstitch machines and more particularly to rotary take-up devices on such machines for controlling and taking up the needle thread.

Lockstitch machines require the yielding and taking up of a substantial amount of needle thread on each cycle of the machine. Oscillatory take-up devices have been found objectionable for various reasons. When operated at high speeds they set up vibrations which interfere with the proper operation of the machine and in general they have a greater tendency to break the thread than rotary take-ups and are not capable of such accurate control of the thread. Rotary take-ups as heretofore constructed have also led to various difficulties due to improper engagement of the thread by the take-up elements at times, and particularly upon breakage of the thread.

A primary object of the present invention has been to provide a rotary take-up which will at all times, during normal operation, exercise the desired control over the thread and will also reduce to a minimum the abnormal or improper engagement of the thread with the take-up means. Such abnormal engagement can occur only upon breakage of the thread and is then confined to a brief interval even though the operation of the machine continues. Toward the latter end there has been provided an arrangement by which any thread which may become wrapped about portions of the take-up means, as a result of breakage, will be quickly and effectively dislodged from the moving parts and thus prevent continuously drawing thread from the source of supply and wrapping it around such parts.

Another object has been to provide for the quick and ready removal of any thread which is severed in the operation of the foregoing devices, thereby preventing subsequent interference with the take-up action when the machine is rethreaded.

In conjunction with the foregoing, another object has been to provide for the quick and easy threading of the take-up means in a manner to insure proper engagement of the thread with the various controlling means.

Still another object has been to provide means for the effective lubrication of the various bearing surfaces of the take-up and its operating means, together with the lubrication of the other operative devices of the machine.

A special feature of the invention is the provision of a relatively thin or narrow circular thread confining passage in the region of an orbitally movable take-up element to prevent whipping of the thread as it is being taken up or yielded. This guards against wrapping of the thread about, or its improper engagement with, any parts of the take-up or devices associated therewith. To facilitate proper handling of the thread, this passage is made narrower adjacent its center than toward its outer periphery.

Another feature is the provision of an annular guard rim in association with the orbital take-up element for retaining the thread thereon so long as it is properly threaded. This guard rim is arranged to cooperate at all times with an arcuate groove in the outer face of the take-up element. It is also provided with an inclined shoulder adapted to remove thread from the take-up element whenever it has become wrapped around it or otherwise improperly engaged with it. The guard rim, in its preferred form, varies in width around its circumference so that it enters the slot in the take-up element to a greater extent at certain points in the travel of the element than at others. This provides for more perfect control of the thread and insures its proper engagement with the orbital take-up element at all times in the movement of the latter through its orbital path.

A further feature is the provision of a slight inclination or slope to one of the thread engaging edges of the orbital take-up element. This facilitates removal of the thread from the latter when it has become wrapped about it after breakage. At the same time the inclined edge is so disposed as not to interfere with the normal functioning of the take-up element.

In the preferred form of the invention there is provided a slot or opening in the outer cover of the take-up element in the region at which improperly engaged thread is stripped from the orbital element. This brings about or facilitates the removal of the severed thread and prevents it from becoming wrapped about parts of the take-up.

Various other objects, features and advantages of the invention will appear from the detailed description of an illustrative form of the same which will now be given in conjunction with the accompanying drawings, in which:

Fig. 4 is an enlarged detail view showing, in front elevation, the needle head of the machine and various associated parts;

Fig. 5 is an enlarged detail view in end elevation of the upper portion of the machine, as seen from the left in Fig. 1, with the needle head cover and associated parts removed;

Fig. 6 is a bottom plan view of the machine with certain parts broken away to illustrate features normally concealed thereby;

Fig. 7 is an enlarged detail view, in longitudinal section through a modified form of rotary hook and its shaft showing a different means of lubrication of the hook raceway;

Fig. 8 is a transverse sectional view through the shaft of Fig. 7, taken along the line 8—8;

Fig. 9 is a vertical sectional view through the take-up devices and the enclosure therefor, taken along the axis thereof;

Fig. 10 is an edge view, as seen from the front of the machine, of a cover member for the needle head and parts assembled therewith;

Fig. 11 is a face view of the inner side of the cover assembly;

Fig. 12 is a detail, in plan, showing a modified form of knife element for the cover assembly on an enlarged scale;

Fig. 13 is a detail view showing the mounting of the knife element of Fig. 12;

Figs. 14 and 15 are, respectively, a face view and an edge view of a disc element forming part of the rotary take-up;

Fig. 16 and Fig. 17 are, respectively, a face view and an edge view of a companion disc element forming part of the rotary take-up;

Fig. 18 is a face view of a disc-like member, the edge of which is adapted to have a camming action on the thread in effecting a take-up;

Fig. 19 is a sectional view through the member of Fig. 18 taken along the line 19—19;

Fig. 20 is a face view of a partial closure member for the rotary take-up housing;

Fig. 21 is a detail view in section along the line 21—21 of Fig. 20;

Fig. 22 is a detail view in horizontal section through a portion of the take-up housing, taken along the line 22—22 of Fig. 2;

Fig. 23 is an edge view of a thread retaining, guiding and stripping member carried by the take-up cover;

Fig. 24 is a face view of the part shown in Fig. 23;

Fig. 25 is an edge view of the same part taken in the direction indicated by the arrows 25—25 in Fig. 24;

Figs. 26 and 27 are, respectively, a side view and an end view of an orbitally moving take-up element;

Fig. 30 is an outer face view of the modified cover member, shown applied to the needle head;

Fig. 31 is an edge view of said cover member as viewed from the right of Fig. 30; and Fig. 32 is a sectional view through the cover member taken along the line 32—32 of Fig. 28.

Figure 1:
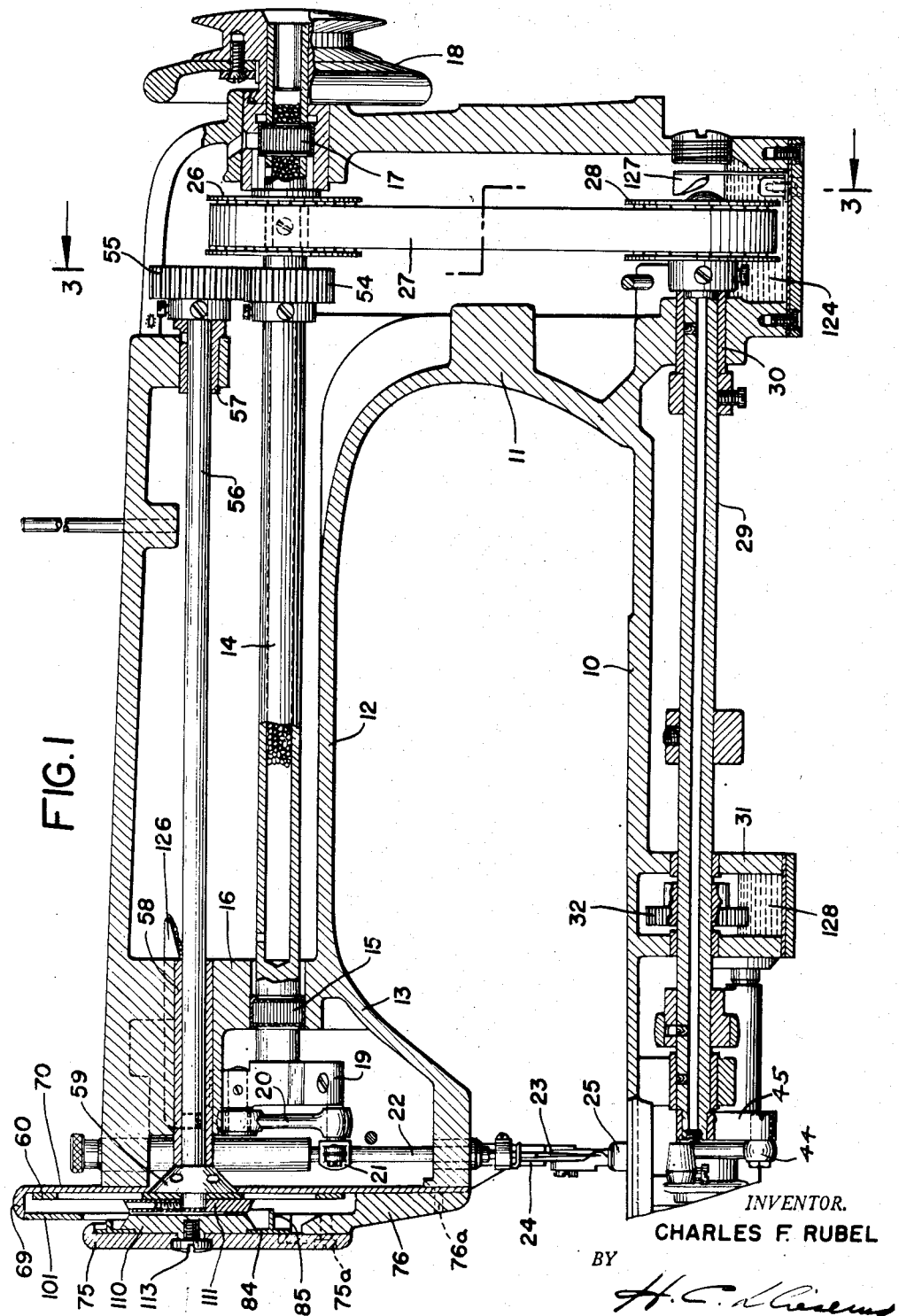
Fig. 1 is a vertical sectional view through the main longitudinal axis of a machine embodying the invention.

Referring now to the drawings, the invention has been illustrated as applied to a machine of the general type shown in the patent to Christensen and Rubel No. 2,113,572, granted April 12, 1938. It is of the lockstitch type having a horizontally disposed rotary hook arranged to be driven at double the R. P. M. of the main drive shaft of the machine. The main frame of the machine, as best shown in Fig. 1, comprises a base or work supporting portion 10, a vertical standard 11, and an overhanging arm 12 terminating at its free end in a needle head 13. Extending longitudinally of the overhanging arm is a main driving shaft 14 which is journalled near its inner end in a needle bearing 15 carried by a partition wall 16 which serves to separate the overhanging arm from the needle head.

Adjacent its opposite end the shaft 14 is journalled in a needle bearing 17 carried by the end wall of the vertical standard. The shaft projects beyond the latter and carries at its outer end a combined handwheel and pulley 18. Within the needle head there is secured to the shaft 14 a balanced crank 19 connected by a link or pitman 20 with a block 21 clamped upon a vertically disposed needle bar 22. The latter carries a needle 23 adapted to be reciprocated from a point above the base 10 to a point below the work supporting surface of the latter. Parallel with the needle bar and behind the same, as viewed in Fig. 1, is a presser bar 24 which carries at its lower end a presser foot 25 of any suitable form (Fig. 5). A spring 24a surrounding the presser bar urges the presser foot toward the work supporting surface. Suitable means, which need not be described, are provided for lifting the presser bar whenever desired.

Within the vertical standard there is secured to the shaft 14 a pulley 26 which is connected by a belt 27 with another pulley 28 secured to a shaft 29 parallel with the shaft 14, but disposed within the base of the machine below the work supporting surface. The belt 27 is preferably formed of a molded plastic which is resistant to oil and provided with toothlike projections on its inner surface adapted to cooperate with corresponding recesses in the pulley wheels 26 and 28 to effect a substantially positive driving connection between the shafts 14 and 29. If desired, these shafts may be connected by suitable gearing, such as shown in said patent to Christensen, et al. No. 2,113,572 or in the patent to Rubel No. 2,400,602, granted May 21, 1946. Shaft 29 is journalled adjacent its right end in a bearing sleeve 30 and near its left end in suitable bearing rings or sleeves carried by a downwardly extending portion 31 of the base member 10 of the frame. Portion 31 is constructed to provide a small enclosure adapted to retain a lubricant and serving to house a gear 32 secured to the shaft 29 and a cooperating pinion 33 secured to a hollow shaft 34. The latter is journalled within a sleeve 35 carried by the base portion of the frame and it is arranged to be driven at twice the angular speed of the shaft 29. At its outer or lefthand end (Fig. 6) the shaft 34 carries the rotary component of a rotary hook 36. The construction and operation of the rotary hook are well known and need not be described herein. It will be understood that as the needle passes through the work to a point below the work supporting surface the needle thread loop will be seized by the beak of the rotary hook which carries it about the stationary bobbin thread within the hook to form a lockstitch.

Any suitable means may be provided for feeding the work in relation to the stitch forming devices to effect the desired seam. These may include an eccentric 37 carried by the shaft 29 and arranged to cooperate with a strap 38 (Fig. 6) secured to one member of a telescoping pitman 39 the other member of which has its opposite end connected pivotally to a feed rocker 40. The bottom of the latter is rockably mounted in the base portion of the frame by means of bearing sleeves 41 and 42. A feed bar 43 pivotally connected with the feed rocker has a downwardly extending arm 44 (Fig. 2) which is connected with a link 45 carrying a strap at its upper end surrounding a suitable eccentric (not shown) at the outer end of the shaft 29. The latter, it will be understood, serves to impart the rising and falling movements to the end of the feed bar which carries a feed dog 46. Feed and return movements of the feed dog are imparted by the rocking of the rocker 40 by means of the eccentric 37. This mechanism is similar to that disclosed in said patent to Christensen, et al. The means disclosed in said patent for varying the feed stroke may also be employed but the adjusting means is preferably modified, as shown, to change its location. As best shown in Fig. 6, the feed stroke varying means may include an arm 47 pivotally connected with the outer telescoping member of the pitman 39 and an arm 48 secured to a rock shaft 49 and pivotally connected with the arm 47. Rock shaft 49 carries an arm 50 at its right end, within the vertical standard, which is urged by a spring 51 (Fig. 3) against the inner end of an adjustable screw element 52 which extends outwardly through the front wall of the vertical standard and carries a knurled head 53 through which the screw element may be turned for adjustment of the feed stroke.

The rotary take-up mechanism will now be described. This is driven by means of a gear 54, secured to the shaft 14 within the vertical standard, which meshes with a gear 55 secured to the end of a take-up shaft 56 (Figs. 1 and 3) journalled in bearing sleeves 57 and 58 carried by the overhanging arm. Shaft 56 is parallel with shaft 14 and extends through the overhanging arm into the needle head. At its left end (Fig. 1) it is provided with an enlarged frusto conical hub 59 which is secured to the shaft and is recessed to receive and surround the end of bearing sleeve 58, as shown in Fig. 9. Hub 59 has secured to its outer, radially extending face a cam-shaped disc 60 which is shown in detail in Fig. 18. Projecting laterally from this disc is an orbitally movable take-up element 61. The details of the latter are best shown in Figs. 26 and 27 and will be described further hereinafter.

The mode of operation of these take-up devices is, in general, similar to that of the cam-like take-up member and the orbital take-up element of Rubel Patent No. 2,446,245, granted August 3, 1948. Needle thread 62 (Fig. 4) supplied from a suitable source is passed through eyelets in a guide element 63 secured to the forward face of the needle head. From this guide element the thread is passed around a thread tensioning device 64, over a check wire 65, and then under a guide element 66 extending through the forward face of the needle head from a block 67 secured to the presser bar. From guide element 66 the thread is passed through an eyelet 68 secured by a screw 68a to the rear face of the take-up housing to be presently described. This housing includes a substantially circular rim 69 which surrounds the disc 60. Radially outward from the thread guide 68 the rim 69 is provided with a transverse slot or opening 69a through which the thread may be readily introduced into the interior of the housing. The latter includes a flat plate 70 which forms the end closure for the needle head and carries, either integrally or otherwise, the rim 69. Plate 70 is provided with an opening of sufficient size to accommodate, with appropriate clearance, the hub 59. It may be secured to the outer face of the needle head by suitable screws, such as that indicated at 70a in Fig. 2. It will be understood that the thread introduced through the slot or opening 69a cooperates with the camming edge of the disc-like member 60. From the edge of this it passes through a slot 71 in a guide member 72 (Fig. 10) which has a flange portion 73 secured by a screw 74 to the edge of a cover member 75. This cover member, in cooperation with other elements to be described, serves to close substantially the entire outer face of the take-up. It is secured by a pair of screws 75a (Figs. 2 and 9) to a member 76 which extends outwardly from the plate 70. Member 76 may be secured to the plate 70, in any suitable way, as by means of rivets 76a. This manner of mounting the cover 75 serves to retain it in suitably spaced relation to the take-up member 60. After passing through the slot 71 in guide member 72, the thread passes around the orbital take-up element 61 and then downwardly to and through a guide 77 carried by the needle bar and finally through the eye of the needle to the work.

As explained fully in said Rubel Patent No. 2,446,245, the combined actions of the disc-like camming member 60 and the orbital take-up element 62 is such that the needle thread will be yielded at the appropriate time to permit it to form the loop about the bobbin case of the rotary hook and will be taken up at the appropriate times to avoid any substantial slack likely to lead to entanglement of the thread with parts of the take-up or with the various guides. When the needle thread breaks, however, it sometimes becomes wrapped about the orbital take-up element 61. This is due to the tension under which the thread is normally placed at the time of breakage. Suitable means are provided for reducing this tendency to a minimum and for removing the thread from the orbital take-up element quickly if and when it becomes abnormally or improperly wound about it. The means for these purposes will now be described.

Referring to Figs. 26 and 27, the orbital take-up element 61 is preferably provided with an outwardly flaring skirt portion 78 at its base. It is secured through rivets 79 or the like to the face of the member 60. The thread engaging portion of the element 61 has a surface 80 which is substantially elliptical in cross-section and is generated by the movement of a straight line held parallel with the axis of the member 60 as it describes the path indicated by the contour of its outer end. A deep arcuate slot 81 extends through the element 61 from its outer face to a plane intermediate the top and bottom surface of the flared skirt portion 78. This arcuate groove, as will be explained more fully hereinafter, permits the element 61 to straddle a flange or rim which projects from the cover 75 into the orbital path of movement of element 61. This flange cooperating with the groove 81 is provided with a shoulder or edge to be described, inclined at an appropriate angle to cause stripping of any thread which may be wrapped around the surface 80. To facilitate this stripping action a portion of the surface 80 is relieved slightly at one side of the slot 81, as indicated at 82. The slight inclination of the edge 82, at an angle of say 20° to the axis of the element 61, facilitates the sliding of any thread wrapped about the surface 80, since the actual periphery of a transverse section through this surface gradually decreases in length toward the outer end of the element.

Secured to the cover 75 is an annular member 85 (Figs. 1, 9, 11, 23, 24, and 25) adapted to lie flat against the inner face of the cover and having extending therefrom a flange or rim 85 which is substantially a full annulus. This is the flange, above mentioned, which extends into the arcuate groove 81. In the normal operation of the take-up it serves to retain the thread properly engaged with the surface 80 of element 61. As best shown in Figs. 23 and 25 the flange 85 is of varying width. For about 150° of its circumference it is relatively narrow, as indicated at the left end of Fig. 25. It gradually increases in width, however, along an inclined edge 86 to the width indicated at the right end of Fig. 25. This width is continued up to a break or slot 87 which is inclined to the axis of the flange and, because of the curvature of the flange, is slightly helical. This provides a diagonally disposed shoulder 88 at the opposite side of the slot or break which, as shown, extends somewhat beyond the edge of the flange just in advance of the break. It is this shoulder which provides the thread stripping action above described as the element 61 is carried past it in the orbital movement of the element. An arcuately formed finger 89 is provided on the flange just above the shoulder 88, this finger being spaced from the narrow portion of the flange 85 by a slot 90. In the operation of the take-up, the needle thread passes through the slot 90 in its course from the guide 72 to the element 61 as the latter is traversing the lower portion of its orbit. Rounding of the free end of the finger 89, as shown, serves to facilitate the passage of the thread into and out of the slot 90 as the element 61 traverses its circular orbit.

Suitable thread severing means is provided for cutting off from the main supply any thread which has become wound about the element 61 and is stripped therefrom by the shoulder 88 in the manner explained. For this purpose, a cutting edge 91 (Fig. 11) is formed at the lower end of a blade 92 secured to the inner face of the cover 75 by means of a screw 93. This blade is preferably located just outside of the flange 85 and preferably has a small extension, as shown in Fig. 11, passing through an opening in said flange. To facilitate the cutting action of the edge 91, the inner face of the cover is provided with a recess 94 in the region of this edge, so that the latter is spaced slightly from the adjacent surface of the cover. An arcuate opening 95 extending through the cover in the region of the cutting edge 91 permits the severed section of thread to be readily removed from the element 61. Such thread will, in fact, be forced partly or completely through said opening by the camming and stripping action of the shoulder 88, the outer end of which is positioned at the opening.

A modified arrangement for severing the thread is illustrated in Figs. 12 and 13. As here shown, a cutting edge 96 is provided on a blade 97 having an opening 98 adapted to receive a screw 99 by which it may be secured to the thread guiding element 72. The latter has a threaded opening to receive the end of the screw 99. As will be seen, the blade 97 extends radially inward from the guide element 72 in a manner to position the cutting edge 96 along substantially the same line as the cutting edge 91 of Fig. 11. The inner end of the blade has an extension 100 adapted to pass through a small opening in the flange 85. In other respects this severing arrangement is similar to that of Fig. 11.

Substantially complete enclosure of the take-up device is provided by the rim 69, plate 70, cover 75, and several partial closures now to be described. These include a member 101, shown in detail in Figs. 20 and 21 and in assembled position in Figs. 2 and 9, which extends over an arc of about 270° around the cover 75. It is held by a plurality of screws 102 cooperating with threaded openings in lugs 103 carried by the housing 69, 70. A slight clearance is provided between the inner edge of the arcuate closure member 101 and the periphery of the cover 75. These parts are separated slightly in both a radial direction and an axial direction. This permits the thread to be readily introduced into the housing in the course of threading the machine. At its lower end the member 101 is provided with a finger 104 formed by a return bend of a portion of reduced width. This finger is preferably bent, in the manner indicated in Fig. 21, first inwardly at 104a to provide a thread receiving pocket 104b inwardly of the main plane of the member, and then outwardly at its outer end to a point beyond the outer face of the member. Cover member 75 is provided with a recess 105 (Figs. 9 and 11) to receive the outer end of finger 104. This finger serves to receive and guide the thread in its passage from the orbital take-up element 61 to the eyelet 77 when the element 61 is traversing the lower part of its course.

Figure 2:
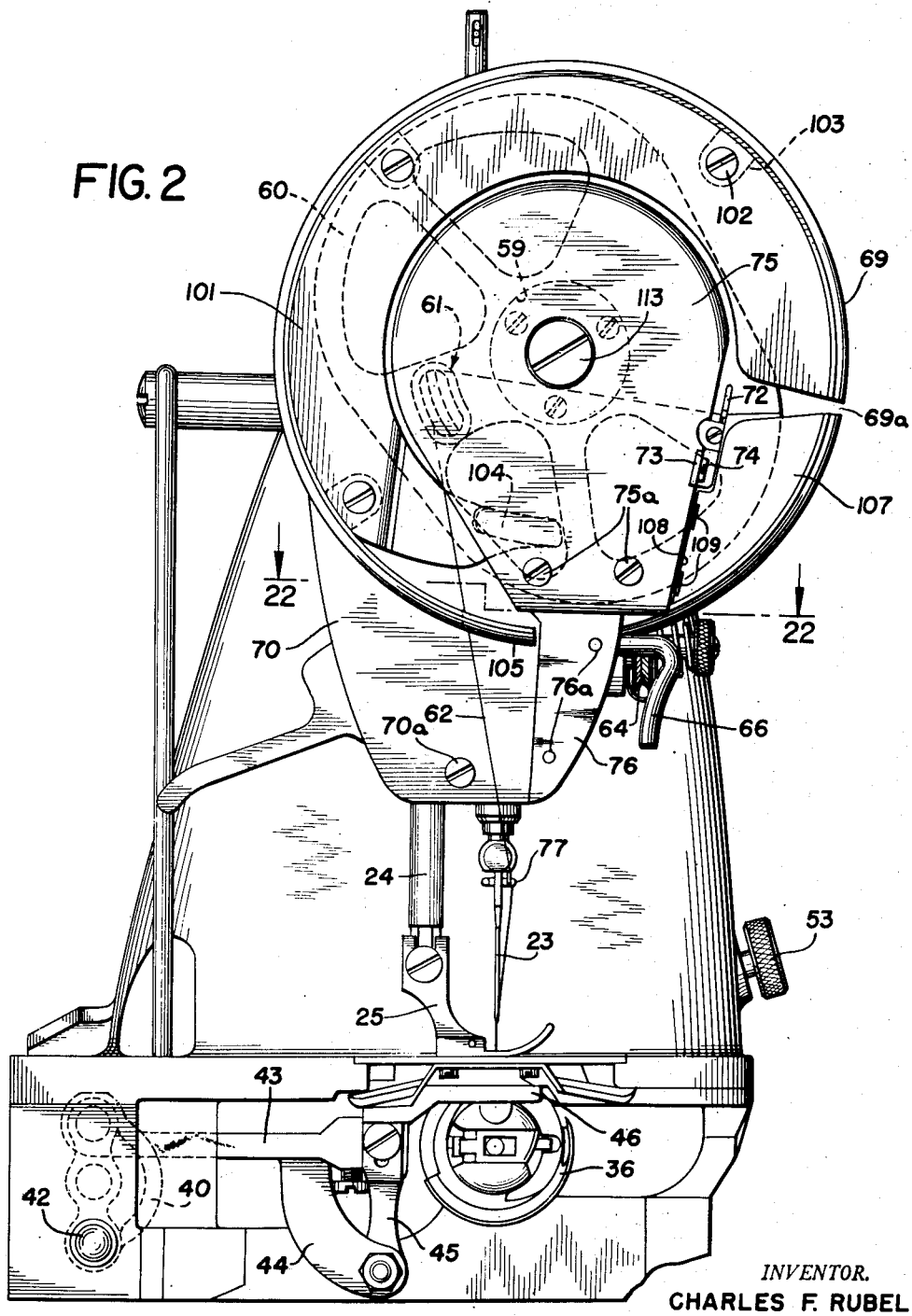
Fig. 2 is an end elevation of the machine as seen from the left in Fig. 1.
Figure 3:
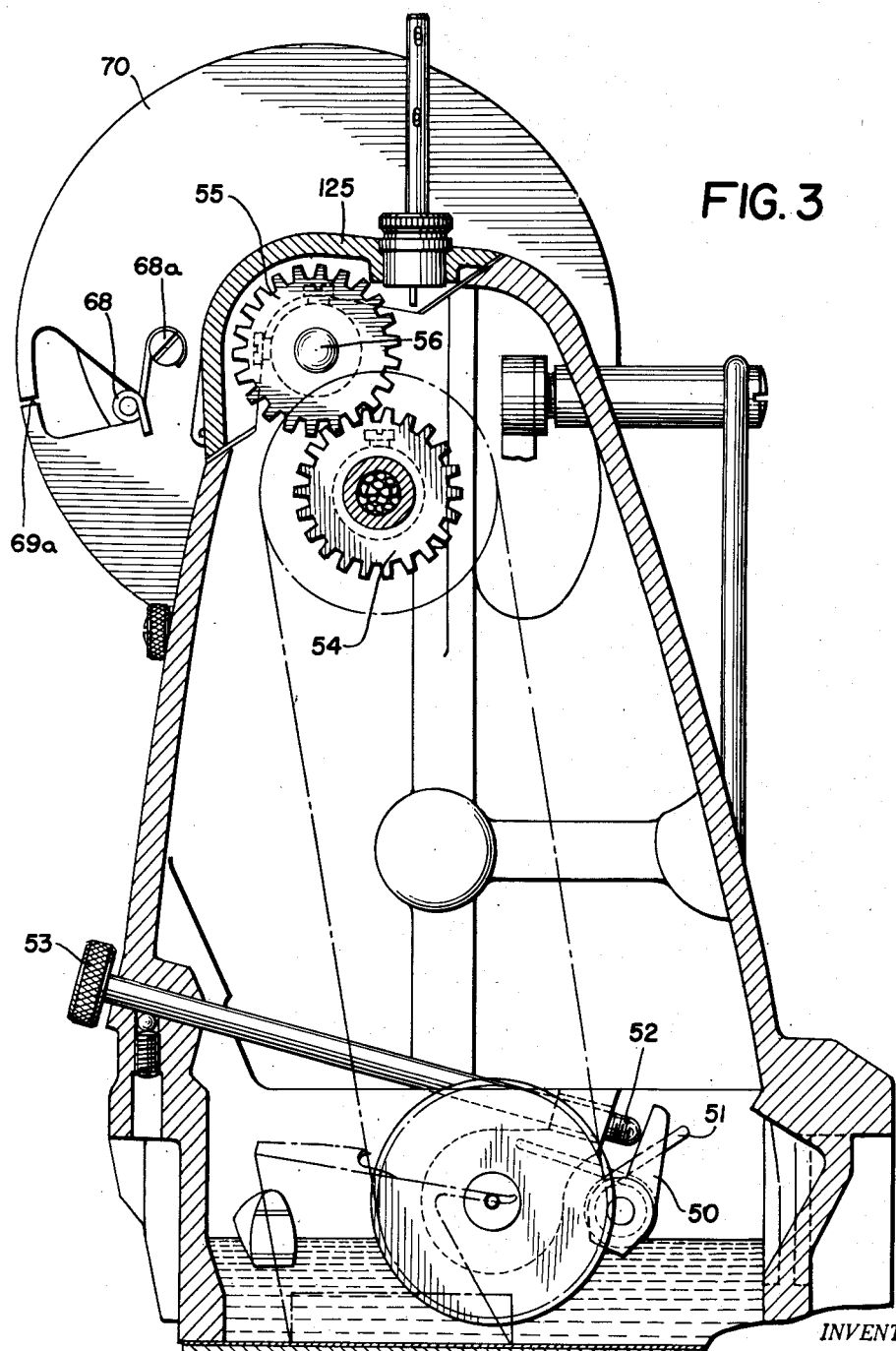
Fig. 3 is a transverse vertical section through the machine taken along the line 3—3 of Fig. 1, certain parts to the right of the plane of said section being shown in broken lines.

To assist further in maintaining the proper position of the thread in its movements back and forth across its normal place, the rim or flange 69 of the housing is bent outwardly at its lowermost point to form a finger 106 (Figs. 2 and 22). A slight gap is provided between the end of this finger and the surface of the member 76 to permit the introduction of the thread in the course of threading the machine. However, due to the combined action of the fingers 104 and 106, there is no danger of outward movement of the thread from its desired path in the regular operation of the machine.

Further enclosure of the take-up devices is effected by a sector-like element 107 having an overturned flange 108 secured by screws 109 to the cover member 75. Element 107 covers the face of the take-up to the right of the cover member (Fig. 2) in the region below the opening 69a through the rim 69 of the housing.

To provide a narrow channel for the movement of the thread as it is taken up and yielded by the orbital element 61, and to prevent whipping of the thread in the course of its rapid movements, a disc 110 is fixedly mounted on the inner face of the cover 75 and a disc 111 is mounted on the outer face of member 60 for rotation therewith. Disc 110 has a small hub-like extension 112 adapted to fit into an opening in the cover member and threaded internally to receive a securing screw 113. The inner face of the disc is rabbeted as indicated at 114 to receive the inner annular edge of the member 84. By this arrangement the screw 113 may serve to retain both member 84 and disc 110 in assembled relation on the cover. The periphery of disc 110 is beveled, as indicated at 115 (Fig. 17), preferably at an angle of about 30° to the axis of the disc. The outer face 116 of the disc is preferably flat. Disc 111 is provided with a recess 117 on its inner side to receive the end of the shaft 56. This recess may, if desired, extend completely through the disc, but preferably a thin section 118 is left to provide a smooth outer face for the disc. A radially extending passage 119 has a reduced inner portion which is threaded to receive a set screw 120 (Fig. 9) for securing the disc to the shaft 56. The outer periphery of the disc 111 is beveled as shown at 121 (Fig. 15). The angle of this bevel is preferably slightly different from that of the disc 110. It has been found desirable to make it about 35° to the axis of the disc. The outer face of disc 11 is flat, in a plane normal to the axis of the disc, in a circular area adjacent the center of the disc, but from a circle indicated by the point 122 in Fig. 14, this face is tapered slightly, at an angle of about 1°, to the plane of the central portion of the disc, as indicated at 123. This serves to provide a slightly wider space between the opposed faces 110 and 111 adjacent their outer peripheries than toward their centers. As the parts are assembled, the gap between the opposed faces of the disc should be about .024", it being understood that the gap is only slightly greater adjacent the periphery than toward the center.

In the operation of the take-up the section of thread extending from the eyelet 68 (Fig. 4) to the needle's eye, along the path hereinabove discussed, is subjected to substantial movements as it is yielded to provide the loop to be carried around the bobbin case and as it is taken up to set the stitch. The various moving and stationary parts of the thread take-up and guiding means are such as to maintain accurate control over the thread. Little slack is provided at any time although a limited amount of slack is always present, except as the stitches are being set, to avoid undue tension upon the thread. The rim or flange 85, projecting inwardly from the cover member plays a part in the accurate control of the thread through the variation in the width of this flange. Furthermore, as will appear from the foregoing description, the flange, through its special configuration, performs a plurality of other functions. It serves to retain the thread on the take-up element 61 as the latter is carried at high speed around its orbit. It also serves to direct the thread into proper coaction with the finger 104 as the element 61 approaches and passes through the lower portion of its orbit. Finger 89 and guide slot 90 serve to catch and retain the thread at certain points in the cycle and the shoulder 88 performs the stripping action above described, whenever the thread becomes abnormally or improperly wound about the element 61. The construction and arrangement of the various thread engaging and guiding elements and the enclosure therefor are such that threading of the needle may be quickly and easily accomplished. In the threading operation it is simply necessary to pass the thread through the various slots and openings indicated and under or behind or over the various shoulders and edges with which it must be engaged, without the necessity of passing the free end of the thread through a closed eye or similar opening, except in the element 63 and the eye of the needle itself. Even these eyes may be provided with side openings to facilitate threading, if desired.

It will be understood that the machine is provided with the usual accessories or adjuncts for most efficient operation. For example, appropriate presser bar lifting mechanism is provided, as shown in part in Figs. 2, 3, 5 and 6. Automatic lubrication of the various bearing surfaces is also provided. For this purpose a lubricant reservoir 124 is formed at the base of the vertical standard and lubricant is normally retained in this to the level indicated in Fig. 1. In the operation of the machine the driving pulley and belt will create a spray or mist of lubricant throughout the vertical standard and the overhanging arm. A removable cover 125 (Fig. 3) is provided over a portion of the top of the standard, this being of suitable contour to accommodate the gear 55. A portion of the lubricant mist in the standard will be delivered to this gear and gear 54 as well as to various other surfaces requiring lubrication. A wick filled tube 126 extending through the wall 16, between the hollow of the overhanging arm and the needle head, is arranged to catch some of the lubricant from the mist and deliver it through the wicks to various points in the needle head. Excess lubricant dripping from the upper portion of the vertical standard will be in part collected by a member 127 which is so shaped and arranged as to cause delivery of lubricant to the interior of the shaft 29. Gear 32 and pinion 33 are lubricated by a mist generated by gear 32 from a body of lubricant 128 within the small enclosed housing 31. Referring to Fig. 6, lubrication of the hook raceway may be accomplished in a manner similar to that disclosed in the application of Christensen and Rubel, Serial No. 694,688, filed September 4, 1946 now Patent No. 2,530,860 dated Nov. 21, 1950. For this purpose, a small auxiliary reservoir 129 is provided beneath the work supporting surface of the base and this communicates with the end of the hollow hook shaft 34. Within the latter a spiral, spring-like element 130 is provided to assist in feeding the lubricant toward the left to the hook raceway.

In Fig. 7 there is shown a modified arrangement for supplying lubricant to the hook raceway. This is similar to that shown in Fig. 6, except for the replacement of the spiral member 130 by a straight rod 131. The right hand end of this rod is reduced in diameter, as indicated at 132, and passes through a reduced opening at the end of the shaft. Sufficient clearance is provided between the opening and the stem 132 to permit a desired flow of lubricant to the shaft. A groove 133, of suitable depth and width and disposed parallel with the axis of the rod, communicates with a narrow slot or groove 134 extending the balance of the length of the rod to its opposite end. The depth and width of slot 134 is such as to permit the passage of only the right amount of lubricant to supply the requirements of the hook raceway. Such lubricant is delivered into the pocket 135 in the base of the rotary hook from which it is discharged radially through passage 136 and thence through passage 137 to the raceway. Rod 131 fits snugly within the bore of the shaft and turns as a unit with the latter.

In Figs. 28 to 32 inclusive there is shown a modified form of cover which may be used in lieu of member 75 of the embodiment described above. The modified cover is of integral construction and has, as a part of the one piece, the several parts directly connected together to form the cover 75, including the member 84 and disc 110. The modified cover may be formed as a die casting of a suitable material, such as "Lynite." It is designated generally by the number 139 and comprises a main circular body 140 having a downward extension 141. The inner face of the circular portion 140 is preferably elevated slightly from the corresponding surface of portion 141. A rim 142 projects laterally from the outer edge of the circular portion 140 over an arc of about 120°. Radially inward of rim 142 is a substantially complete annular rim or flange 143 which projects laterally from the inner face of the cover, this flange being of variable width corresponding with the variations in the width of flange 85. A shoulder 144 is provided diagonally across the flange 143 by an angled slot or opening extending through the flange. That part of the flange which carries the shoulder projects a somewhat greater distance from the inner face of the cover than does the adjacent part of the flange at the opposite side of the slot, and it is formed to provide a thread retaining finger 145 and a thread receiving and guiding slot 146. At the center of the circular portion 140 of the cover a raised disc-like formation 147 is provided, this serving the purpose of the disc 110 of the first embodiment. It has a bevelled edge 148 and is otherwise constructed similarly to the disc 110.

Figure 28:
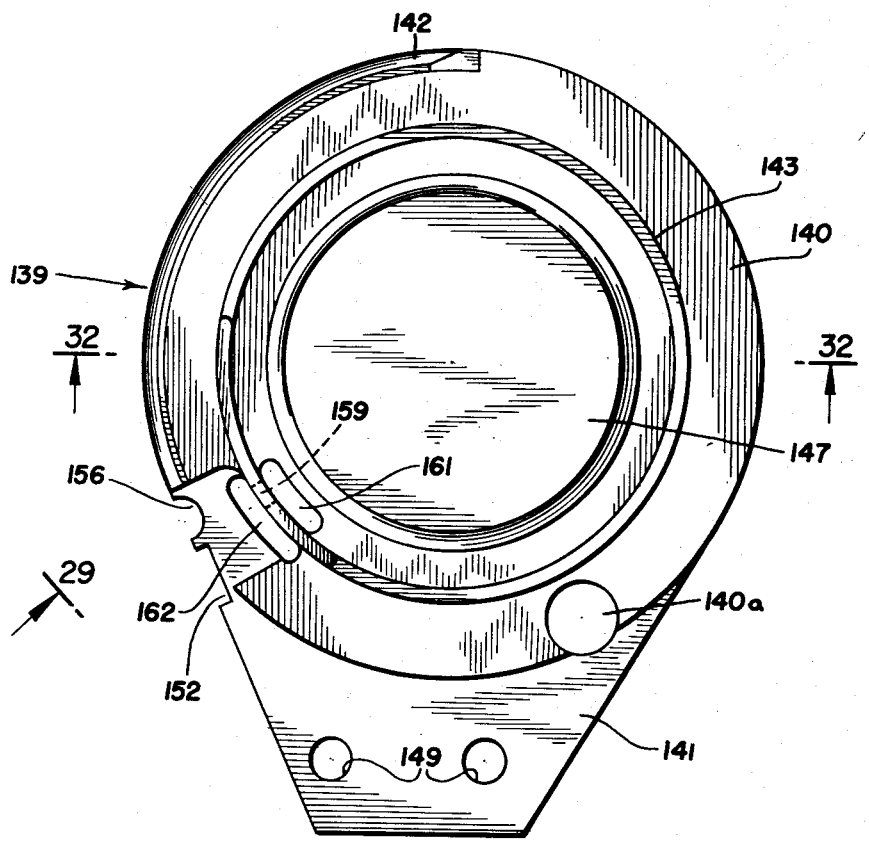
Fig. 28 is a face view of the inner side of a modified form of cover member for the rotary take-up.
Figure 29:
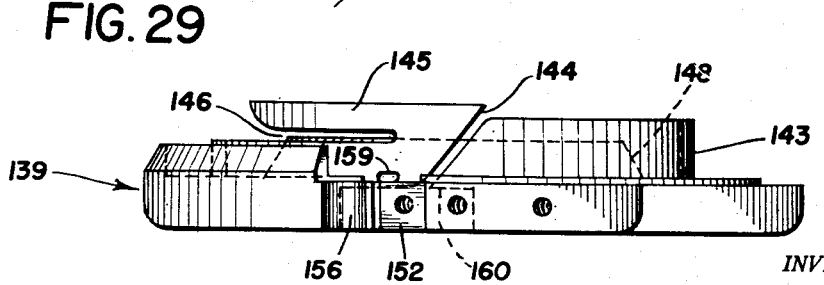
Fig. 29 is an edge view of the cover member of Fig. 28 taken in the direction indicated by the arrows 29—29 in Fig. 28.

For attachment of the cover 139 to the take-up housing, openings 149 are provided in the portion 141 to receive screws 150 (Fig. 30). These screws cooperate with threaded openings in a member 151 (similar to member 76) secured to a plate 151a which closes the outer face of the needle head. A recess 140a on the inner face of the cover (similar to recess 105) is adapted to receive the end of the finger 104 in the manner previously explained. The left edge of the cover, as viewed in Fig. 28, is recessed, as indicated at 152, to receive a portion 153 of a thread guiding member 154, similar to guide member 72 of the first embodiment. A screw 155 serves to retain the guide member in position. A semi-cylindrical depression 156, just above the groove 152, is provided for clearance purposes with respect to a screw 157 adapted to retain a cutting blade 158, similar to blade 97 of Fig. 12. The projecting end of this blade, corresponding with end 100 of Fig. 12, is adapted to enter an opening 159 (Fig. 29) provided in the flange 143. On its outer face, the cover is provided with a relatively large recess 160 which extends into the cover a substantial distance, but does not pass completely through it. The depth of the opening is best shown in Fig. 29. From its bottom, two openings 161 and 162 extend the balance of the way through the cover leaving between them extensions of the rim or flange 143. Below the groove 152, the edge of the cover presents a flat surface provided with screw threaded holes 163 adapted to receive screws 164 for attaching an overturned flange 165 of a partial closure member 166 corresponding with member 107 of the first embodiment. It will be understood that the integral cover construction of Figs. 28 to 32 functions in the same manner as the cover 75 and attached parts of the first embodiment.

While a preferred embodiment of the invention and certain modifications of portions thereof have been described in considerable detail, it will be understood that various changes may be made in the construction and arrangement of the several parts, and some may be omitted or replaced by other parts, without departing from the general principles and scope of the invention as defined by the appended claims.

What is claimed is:

1. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, and a fixed cover member parallel with the path of movement of said element and disposed adjacent said path, said cover member carrying a substantially continuous circular flange extending into the path of said element and arranged to be received by said arcuate groove in said element, said flange cooperating with the thread properly engaged by said element to retain the same thereon.

2. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, and a fixed cover member parallel with the path of movement of said element and disposed adjacent said path, said cover member carrying a substantially continuous circular flange extending into the path of said element and arranged to be received by said arcuate groove in said element, said flange cooperating with the thread properly engaged by said element to retain the same thereon and said flange having an opening therein providing a diagonally disposed shoulder arranged to engage and remove any thread which may become abnormally wound around said element.

3. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, and a fixed cover member parallel with the path of movement of said element and disposed adjacent said path, said cover member carrying a substantially continuous circular flange extending into the path of said element and arranged to be received by said arcuate groove in said element, said flange having a portion extending into said groove a greater distance than another portion thereof, and the free edge of said flange serving to engage the thread and retain the same at different positions along the face of said element.

4. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, and a fixed cover member parallel with the path of movement of said element and disposed adjacent said path, said cover member carrying a substantially continuous circular flange extending into the path of said element and arranged to be received by said arcuate groove in said element, said flange cooperating with the thread properly engaged by said element to retain the same thereon and said flange having an opening therein providing a diagonally disposed shoulder arranged to engage and remove any thread which may become abnormally wound around said element, said diagonally disposed shoulder extending into said arcuate groove a greater distance than the adjacent portion of the flange at the opposite side of said opening.

5. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, and a fixed cover member parallel with the path of movement of said element and disposed adjacent said path, said cover member carrying a substantially continuous circular flange extending into the path of said element and arranged to be received by said arcuate groove in said element, said flange having a slot therein disposed at an angle to an element of the cylindrical surface of the flange, thereby providing a shoulder for engagement of thread abnormally wound about said element, said shoulder being so arranged that its outer end first enters said groove in the element as the latter is carried around its orbital path, the portion of said flange which carries said shoulder extending into said groove further than the adjacent portion at the opposite side of said slot.

6. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, and a fixed cover member parallel with the path of movement of said element and disposed adjacent said path, said cover member carrying a substantially continuous circular flange extending into the path of said element and arranged to be received by said arcuate groove in said element, said flange having a slot therein disposed at an angle to an element of the cylindrical surface of the flange, thereby providing a shoulder for engagement of thread abnormally wound about said element, said shoulder being so arranged that its outer end first enters said groove in the element as the latter is carried around its orbital path, the portion of said flange which carries said shoulder extending into said groove further than the adjacent portion at the opposite side of said slot, said first mentioned portion having a circumferentially disposed slot extending from a point near but spaced slightly from said shoulder and having an open outer end permitting the free entry therein of a part of the thread lying in the path of said element.

7. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a fixed cover member parallel with the path of movement of said element and disposed adjacent said path, said cover member having associated therewith an arcuate thread positioning member arranged to pass through said arcuate groove upon the orbital movement of said element, and means carried by said disc-like member and by said cover providing a narrow thread confining channel in the plane of the path of said element.

8. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a fixed cover member parallel with the path of movement of said element and disposed adjacent said path, said cover member having associated therewith an arcuate thread positioning member arranged to pass through said arcuate groove upon the orbital movement of said element, and means carried by said disc-like member and by said cover presenting closely spaced substantially parallel surfaces which provide a narrow thread confining channel in the plane of the path of said element.

9. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a fixed cover member parallel with the path of movement of said element and disposed adjacent said path, said cover member having associated therewith an arcuate thread positioning member arranged to pass through said arcuate groove upon the orbital movement of said element, and means carried by said disc-like member and by said cover presenting closely spaced substantially parallel surfaces which provide a narrow thread confining channel in the plane of the path of said element, said surfaces diverging slightly adjacent their outer edges to facilitate introduction of the thread therebetween.

10. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a fixed cover member parallel with the path of movement of said element and disposed adjacent said path, said cover member having associated therewith an arcuate thread positioning member arranged to pass through said arcuate groove upon the orbital movement of said element, and a plurality of disc-like elements projecting from said disc-like member and said cover, respectively, said disc-like elements having substantially flat faces in opposed relation and spaced only a slight distance apart to provide a thread confining channel inside of the path of movement of said thread engaging element.

11. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a fixed cover member parallel with the path of movement of said element and disposed adjacent said path, said cover member having associated therewith an arcuate thread positioning member arranged to pass through said arcuate groove upon the orbital movement of said element, and a plurality of disc-like elements projecting from said disc-like member and said cover, respectively, said disc-like elements having substantially flat faces in opposed relation and spaced only a slight distance apart to provide a thread confining channel inside of the path of movement of said thread engaging element, and said disc-like elements having beveled peripheral edges sloping inwardly toward the opposed faces thereof to facilitate introduction of the thread between said faces.

12. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a fixed cover member parallel with the path of movement of said element and disposed adjacent said path, said cover member having associated therewith an arcuate thread positioning member arranged to pass through said arcuate groove upon the orbital movement of said element, means carried by said disc-like member and by said cover providing a narrow thread confining channel in the plane of the path of said element, and means substantially surrounding said disc-like member and serving with said cover to substantially enclose the same and the orbital path of said element, said last mentioned means and said cover having their upper portions spaced sufficiently to permit the introduction of thread therebetween into cooperation with said element.

13. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a fixed cover member parallel with the path of movement of said element and disposed adjacent said path, said cover member carrying a substantially continuous circular flange extending into the path of said element and arranged to be received by said arcuate groove in said element, said flange cooperating with the thread properly engaged by said element to retain the same thereon, and means substantially surrounding said disc-like member and serving with said cover to substantially enclose the same and the orbital path of said element, said last mentioned means and said cover having their upper portions spaced sufficiently to permit the introduction of thread therebetween into cooperation with said element.

14. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, and a fixed cover member parallel with the path of movement of said element and disposed adjacent said path, said cover member carrying a substantially continuous circular flange extending into the path of said element and arranged to be received by said arcuate groove in said element, said flange cooperating with the thread properly engaged by said element to retain the same thereon, said flange being provided with a circumferentially extending slot open at one end and arranged to receive and guide the thread in the plane of said orbital path.

15. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a fixed cover member parallel with the path of movement of said element and disposed adjacent said path, said cover member carrying a substantially continuous circular flange extending into the path of said element and arranged to be received by said arcuate groove in said element, said flange cooperating with thread extending from a point radially inward of said flange to a point radially outward thereof and properly engaged by said element to retain the same thereon and said flange having an opening therein providing a diagonally disposed shoulder arranged to engage and remove any thread which may become abnormally wound around said element, and means carried by said cover for severing the thread as it is removed from said element by said diagonally disposed shoulder.

16. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a fixed cover member parallel with the path of movement of said element and disposed adjacent said path, said cover member carrying a substantially continuous circular flange extending into the path of said element and arranged to be received by said arcuate groove in said element, said flange cooperating with thread extending from a point radially inward of said flange to a point radially outward thereof and properly engaged by said element to retain the same thereon and said flange having an opening therein providing a diagonally disposed shoulder arranged to engage and remove any thread which may become abnormally wound around said element, and means carried by said cover for severing the thread as it is removed from said element by said diagonally disposed shoulder, said cover being provided with an opening in the region of said diagonally disposed shoulder for the removal of the severed thread from said element.

17. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, and a fixed cover member parallel with the path of movement of said element and disposed adjacent said path, said cover member having associated therewith an arcuate member arranged to pass through said arcuate groove upon the orbital movement of said element, said arcuate member having a thread positioning slot for guiding thread to said element between a point radially outward of said member and a point radially inward thereof in the normal operation of said take-up and having an inclined shoulder adapted to engage and remove from said element any thread which has become abnormally wound thereabout, said cover having an opening therethrough adjacent said arcuate member to facilitate the removal of abnormally wound thread removed from said element by said member.

18. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, and a fixed cover member parallel with the path of movement of said element and disposed adjacent said path, said cover member having associated therewith an arcuate member arranged to pass through said arcuate groove in said element as the latter is carried around its orbital path, said arcuate member having an inclined shoulder adapted to remove thread which has become abnormally wound about said element, the outer portion of said element having its trailing edge disposed at an acute angle to said disc-like member in a direction to reduce the cross-sectional area of said element toward its outer end to facilitate removal of abnormally wound thread therefrom.

19. In a lockstitch sewing machine, a rotary take-up comprising a thread engaging element arranged to be carried through a circular path, said element having an arcuate groove extending through the same, a thread removing member adapted to traverse said arcuate groove as said element is carried around its circular path, said member being arranged to strip from said element thread which has become abnormally wound about the same and to shift said thread toward one end of said element, the outer portion of said element having its trailing edge inclined to the plane of said circular path in a direction to reduce the cross-sectional area of said element toward said one end thereof, to facilitate stripping of the thread abnormally wound about the same.

20. In a lockstitch sewing machine a rotary take-up which comprises a rotary shaft, a disc-like member secured to said shaft, an orbitally movable thread engaging element carried by said member and projecting laterally therefrom, said element having an arcuate groove in the outer face thereof curved about the axis of said shaft, a substantially circular housing surrounding said disc-like member and the orbital path of said element, a partial closure carried by said housing and surrounding said orbital path, a cover associated with said housing and partial closure and substantially completing the enclosure of said disc-like member and said circular path, said cover being slightly spaced from said partial closure to permit the introduction of thread therebetween into the path of said element, and said partial closure having a finger thereon arranged to guide the thread as it passes out of said housing.

CHARLES F. RUBEL.

REFERENCES CITED

The following references are of record in the file of this patent:

UNITED STATES PATENTS

| Number | Name | Date |
|---|---|---|
| 2,446,245 | Rubel | Aug. 3, 1948 |